(12) United States Patent
Berg et al.

(10) Patent No.: US 11,105,371 B2
(45) Date of Patent: Aug. 31, 2021

(54) RETAINED ROLLER SET AND ROLLER BEARING INCLUDING SAME

(71) Applicant: AKTIEBOLAGET SKF, Gothenburg (SE)

(72) Inventors: Roger Gustav Petter Berg, Gothenburg (SE); Roger Daniel Emlind, Alingsas (SE); Arne Lars Jonas Kullin, Landvetter (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/005,402

(22) Filed: Aug. 28, 2020

(65) Prior Publication Data

US 2021/0102574 A1 Apr. 8, 2021

(30) Foreign Application Priority Data

Oct. 2, 2019 (DE) .......................... 102019215229.5

(51) Int. Cl.
*F16C 19/26* (2006.01)
*F16C 33/54* (2006.01)
*F16C 33/51* (2006.01)

(52) U.S. Cl.
CPC .............. *F16C 33/51* (2013.01); *F16C 19/26* (2013.01); *F16C 33/547* (2013.01)

(58) Field of Classification Search
CPC ........ F16C 19/24; F16C 19/26; F16C 33/467; F16C 33/4767; F16C 33/51; F16C 33/513; F16C 33/54; F16C 33/542; F16C 33/543; F16C 33/545; F16C 33/546; F16C 33/547; F16C 33/548; F16C 33/4682

See application file for complete search history.

(56) References Cited

U.S. PATENT DOCUMENTS

| | | | | |
|---|---|---|---|---|
| 449,968 | A * | 4/1891 | Simonds | F16C 19/10 384/614 |
| 2,010,113 | A * | 8/1935 | Scribner | F16C 19/364 384/578 |
| 2,729,520 | A * | 1/1956 | Ritchie | F16C 19/48 384/577 |
| 6,354,745 | B1 | 3/2002 | Ai | |
| 6,599,019 | B2 * | 7/2003 | Matsui | F16C 33/4623 384/450 |
| 2016/0040717 | A1 * | 2/2016 | Linden | F16C 33/427 384/575 |
| 2020/0132121 | A1 * | 4/2020 | Carpenter | F16C 19/305 |

FOREIGN PATENT DOCUMENTS

JP 2008249105 A * 10/2008 ............ F16C 33/547

* cited by examiner

*Primary Examiner* — Alan B Waits
(74) *Attorney, Agent, or Firm* — J-Tek Law PLLC; Scott T. Wakeman; Mark A. Ussai

(57) ABSTRACT

A retained roller set includes first and second individual tube-shaped members each having first and second axially spaced rings connected by bar elements that define pockets therebetween, the tube-shaped members being coaxially arranged and radially spaced to define a circumferentially extending intermediate space therebetween in which a plurality of roller elements are received and retained by the pockets of the first and second tube-shaped members.

14 Claims, 3 Drawing Sheets

RETAINED ROLLER SET AND ROLLER BEARING INCLUDING SAME

CROSS-REFERENCE

This application claims priority to German patent application no. 10 2019 215 229.5 filed on Oct. 2, 2019, the contents of which are fully incorporated herein by reference.

TECHNICAL FIELD

The present disclosure is directed to a retained roller set including a pair of roller retainers and a plurality of roller elements retained thereby and to a roller bearing including the retained roller set and to a rotatable load bearing system comprising the roller bearing having the retained roller set.

BACKGROUND

In some types of rotatable load bearing systems it may be advantageous to provide at least one roller bearing which can accommodate both shaft misalignment and axial shaft displacements. These rotatable load bearing systems commonly comprise a locating bearing position and one or more non-locating bearing positions which may be provided on a rotatable or non-rotatable shaft. The aforementioned roller bearing is commonly provided at a non-locating bearing position.

Further, many rotatable load bearing systems need to be serviced during their lifetimes. During service, the systems often need to be disassembled, and this requires removing the roller bearings from their bearing positions. This procedure may be difficult and time consuming, and also the roller bearings may be damaged when they are removed. For example, a roller bearing may be stuck at its bearing position and special tools and/or high pulling forces may be required to remove it.

One way of facilitating the disassembly process may be to provide a separable roller bearing. The separable roller bearing is configured so that one of its bearing rings can be removed separately from the bearing position whilst the other bearing ring remains at the bearing position. It has been found that the rollers, which may be supported in a cage, may fall out when removing one of the rings. This may lead to the rollers unintentionally falling out and being damaged, which also may be a safety risk for e.g. maintenance personnel.

Accordingly, it would be desirable to develop improved solutions which eliminate or at least reduce the above mentioned challenges.

SUMMARY

In view of the above, one aspect of the disclosure comprises a retained roller set. Another aspect of the disclosure comprises a roller bearing including the retained roller set, and a further aspect of the disclosure comprises a rotatable load bearing system that includes the roller bearing with the retained roller set which overcomes or ameliorates at least one of the disadvantages of the prior art, or to provide a useful alternative.

According to a first aspect of the disclosure, a retained roller set comprises a first individual tube-shaped member having an axial extension along a rotational axis of the retained roller set and a radial extension which is perpendicular to the rotational axis. The first individual tube-shaped member comprises a first annular ring and a second annular ring having a respective radial center which coincides with the rotational axis, wherein the first annular ring and the second annular ring are arranged axially offset with respect to each other. The first individual tube-shaped member further comprises a plurality of circumferentially distributed first bar elements which extend axially between and join the first and second annular rings, defining a plurality of roller element pockets therebetween. The retained roller set further comprises a second individual tube-shaped member having an axial extension along the rotational axis and a radial extension which is perpendicular to the rotational axis. The second individual tube-shaped member comprises a third annular ring and a fourth annular ring having a respective radial center which coincides with the rotational axis, wherein the third annular ring and the fourth annular ring are arranged axially offset with respect to each other. The second individual tube-shaped member further comprises a plurality of circumferentially distributed second bar elements which extend axially between and join the third and fourth annular rings, defining a plurality of roller element pockets therebetween. Further, the second individual tube-shaped member has an outer radius which is smaller than an inner radius of the first individual tube-shaped member and is further provided radially inside the first individual tube-shaped member such that a circumferentially extending intermediate space for roller elements is formed therebetween. The retained roller set further comprises a plurality of roller elements, wherein each one of the plurality of roller elements is provided in the circumferentially extending intermediate space and radially extends into a respective roller element pocket of the first and second individual tube-shaped members.

By providing the retained roller set as set forth herein, an improved retaining function for roller elements is achieved. In fact, the inventors have realized that the present configuration may be advantageously used in a separable roller bearing, whereby the retained roller set allows the roller elements to be retained even after the bearing rings of the separable roller bearing have been separated. Hence, the retained roller set as disclosed herein is a self-contained unit where the first and second individual tube-shaped members and the roller elements cooperate so that the roller elements are kept in place without falling out from their respective positions. It shall however be noted that the present invention is not limited to separable roller bearings only, but may also be used and implemented in other types of roller bearings. Moreover, the configuration of the retained roller set may allow the load carrying capacity to be increased, or even maximized, since a larger amount of roller elements can be provided between the first and second tube-shaped members. Further, the configuration has also shown to facilitate manufacturing of the retaining members of the retained roller set, i.e. manufacturing of the two individual tube-shaped members may be more cost-efficient compared to manufacturing of conventional bearing cages for e.g. spherical roller bearings and/or toroidal roller bearings. Still further, by the configuration of the retained roller set, the roller elements may also be more cost-efficiently produced. More particularly, there is no need to provide dimples or the like on the axial sides of the roller elements since the two individual and radially offset tube-shaped members may sufficiently guide the roller elements and prevent/reduce roller skew during use.

Optionally, each one of the plurality of circumferentially distributed first bar elements are provided radially outside a pitch circle of the retained roller set and/or each one of the plurality of circumferentially distributed second bar elements are provided radially inside the pitch circle of the retained roller set, as seen in a sectional plane being perpendicular to the rotational axis. Thereby more roller elements may be provided in the circumferentially extending intermediate space. For example, the number of roller elements may equal, or at least be close to, the number of roller elements in a corresponding full-complement roller bearing which has no cage/retaining member for its rollers elements.

Optionally, the plurality of roller elements may be barrel-shaped roller elements. Barrel-shaped roller elements are useful for roller bearings which have self-aligning capabilities and optionally also axial displacement capabilities.

Optionally, the first and second individual tube-shaped members may be adapted so that an open axial side face is formed between the first and second individual tube-shaped members on at least one outer axial side of the retained roller set. Thereby lubrication during use of the retained roller set for the roller elements may be improved. More particularly, an open side face allows lubricant, such as oil or grease, to more easily flow through the retained roller set.

A second aspect of the disclosure comprises an outer bearing ring, an inner bearing ring and the retained roller set of the first aspect of the disclosure, wherein the retained roller set is interposed between the outer and inner bearing rings. Advantages provided by the second aspect are largely analogous to the advantages provided for the first aspect. Moreover, all embodiments of the first aspect are applicable to all embodiments of the second aspect and vice versa.

Optionally, the roller bearing may be configured as a toroidal roller bearing and/or adapted so that the inner and outer bearing rings can be relatively misaligned with respect to the rotational axis and/or axially displaced with respect to each other. Thereby the roller bearing may be suitable for and advantageously provided at a non-locating bearing position.

Optionally, one of the outer and inner bearing rings may comprise a cylindrically shaped bearing raceway, as seen in a sectional plane defined by the rotational axis. Thereby, by providing a cylindrically shaped bearing raceway, the roller bearing may be a separable roller bearing, as mentioned hereinabove. Still optionally, the other one of the outer and inner bearing rings may comprise a curve-shaped bearing raceway, preferably a toroidal-shaped bearing raceway, as seen in a sectional plane defined by the rotational axis. Thereby the roller bearing may be adapted to provide self-aligning capability and also optionally axial displacement capability. Axial displacement capability as used herein means that the roller bearing is adapted so that its outer and inner bearing rings can be axially displaced relative each other. Self-aligning capability as used herein means that the outer and inner bearing rings can be relatively misaligned, with respect to the rotational axis of the roller bearing.

Optionally, the roller bearing may be a separable roller bearing which is configured so that one of its bearing rings can be separately dismounted from a rotatable load bearing application without the need to simultaneously dismount the other bearing ring therefrom.

A third aspect of the disclosure comprises a rotatable load bearing application having one locating bearing position and at least one non-locating bearing position and the previously described roller bearing at the non-locating position. Advantages provided by the third aspect are largely analogous to the advantages provided by the first and second aspects. Moreover, all embodiments of the first and second aspects are applicable to all embodiments of the third aspect and vice versa.

Optionally, the rotatable load bearing application may be any one of a continuous casting application and a pulp and paper application. More particularly, it has been found that it may be advantageous to use a separable roller bearing which comprises the retained roller set as disclosed herein. During disassembly, which is commonly performed for these applications for servicing, the roller elements will be kept in place without falling out when one of the bearing rings is removed from the application. Furthermore, an increased number of roller elements can be provided between the rings compared to conventional roller bearings having conventional cages.

BRIEF DESCRIPTION OF THE DRAWINGS

Other aspects and features of the disclosure will be better understood from the attached drawings in which.

DETAILED DESCRIPTION

Figure 1:
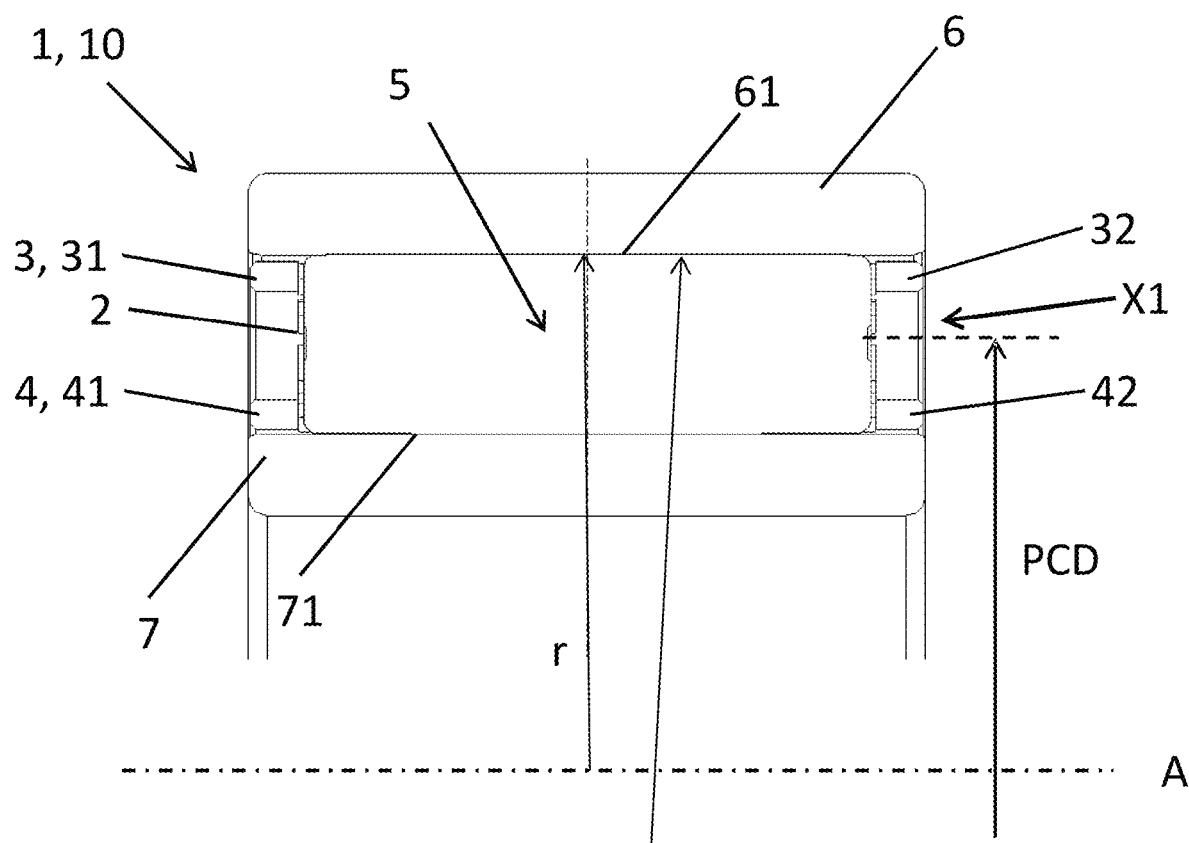
FIG. 1 is a partial sectional view of a roller bearing and a retained roller set having first and second individual tube-shaped members according to an embodiment of the present disclosure.

With reference to the appended drawings, there follows below a more detailed description of embodiments of the invention cited as examples. The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

Figure 3:
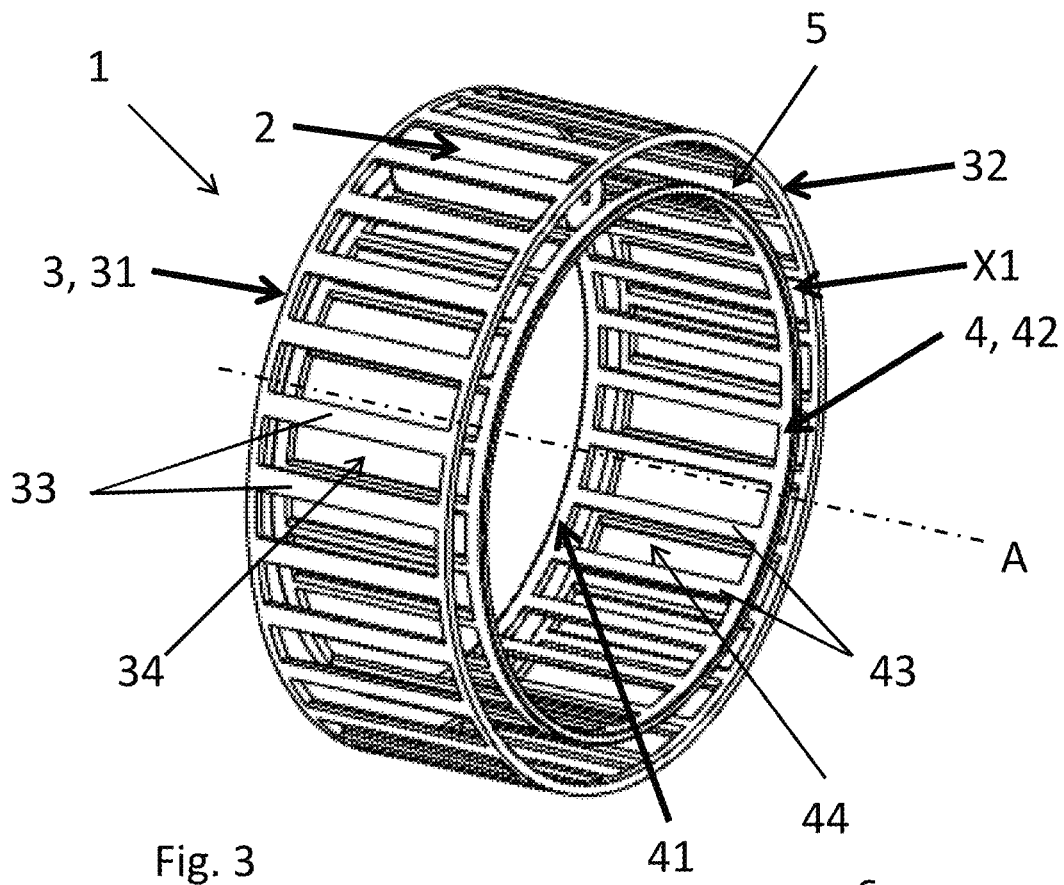
FIG. 3 is a perspective view of the retained roller set of FIG. 1 with all but one of the rollers removed.
Figure 4:
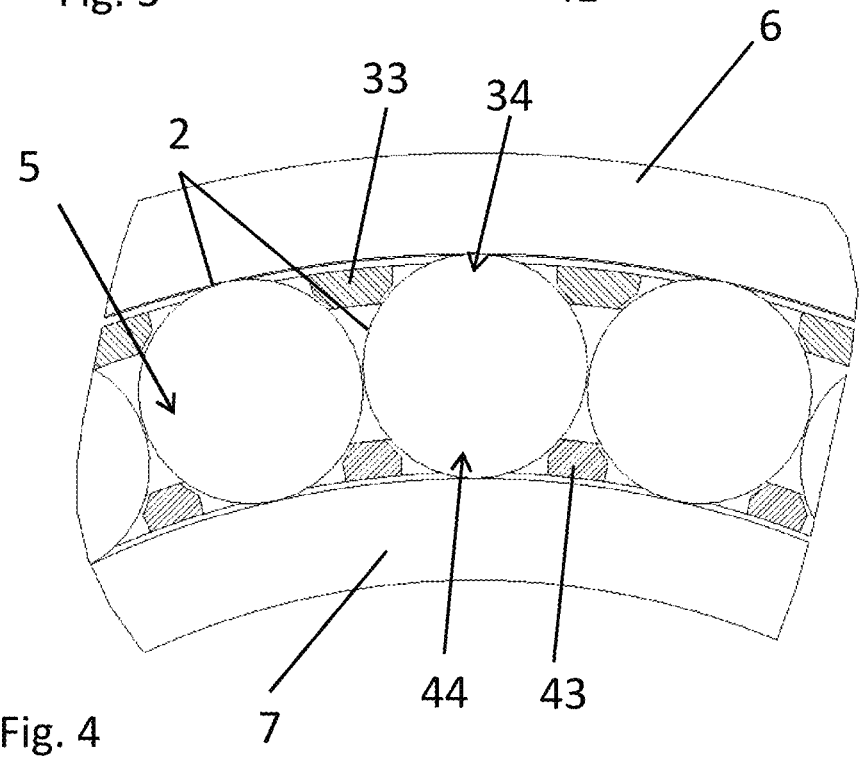
FIG. 4 is a sectional side elevational view of the roller bearing of FIG. 1.

With respect to e.g. FIGS. 1, 3 and 4, a retained roller set 1 and a roller bearing 10 are shown according to exemplary embodiments of the present disclosure. More particularly, FIG. 1 shows a cross sectional view of a roller bearing 10, the cross section being a sectional plane which includes a rotational axis A of the roller bearing 10 and the retained roller set 1. FIG. 3 shows a perspective view of the retained roller set 1 and FIG. 4 shows another cross sectional view of the roller bearing 10, wherein the cross section is a sectional plane which is perpendicular to the rotational axis A.

The retained roller set 1 comprises a first individual tube-shaped member 3 which has an axial extension along the rotational axis A of the retained roller set 1 and a radial extension which is perpendicular to the rotational axis A. The first individual tube-shaped member 3 comprises a first annular ring 31 and a second annular ring 32 which have a respective radial center which coincides with the rotational axis A, wherein the first annular ring 31 and the second annular ring 32 are arranged axially offset with respect to each other. The first individual tube-shaped member 3 further comprises a plurality of circumferentially distributed first bar elements 33 which extend axially between and join the first and second annular rings, 31 and 32, which defines a plurality of roller element pockets 34 therebetween.

The retained roller set 1 further comprises a second individual tube-shaped member 4 which has an axial extension along the rotational axis A and a radial extension which is perpendicular to the rotational axis A. The second individual tube-shaped member 4 comprises a third annular ring 41 and a fourth annular ring 42 which have a respective radial center which coincides with the rotational axis A. The third annular ring 41 and the fourth annular ring 42 are arranged axially offset with respect to each other. The second individual tube-shaped member 4 further comprises a plurality of circumferentially distributed second bar elements 43 which extend axially between and join the third and fourth annular rings, 41 and 42, defining a plurality of roller element pockets 44 therebetween.

The second individual tube-shaped member 4 has an outer radius which is smaller than an inner radius of the first individual tube-shaped member 3 and is further provided radially inside the first individual tube-shaped member 3 such that a circumferentially extending intermediate space 5 for roller elements is formed therebetween.

Further, the retained roller set 1 comprises a plurality of roller elements 2, wherein each one of the plurality of roller elements 2 is provided in the circumferentially extending intermediate space 5 and radially extends into a respective roller element pocket, 34 and 44, of the first and second individual tube-shaped members, 3 and 4 respectively. Thereby, a self-contained unit for the roller elements 2 is formed. It shall be noted that a plurality of roller elements 2 are intended to be provided in the circumferentially extending intermediate space 5 in FIG. 3, but for clarity reasons, only one roller element is shown. By the term "individual member" is herein meant a "separate member". In fact, the first and second individual tube-shaped members, 3 and 4, are preferably only connected to each other via the roller elements 2.

In the shown embodiments, each one of the plurality of circumferentially distributed first bar elements 33 are provided radially outside a pitch circle of the retained roller set 1 and of the roller bearing 10, as seen in a sectional plane being perpendicular to the rotational axis A. The pitch circle, which is a well-known term for the skilled person, is the circle which extends through the rotational axis of all roller elements 2. The pitch circle has a pitch circle diameter PCD as shown in FIG. 1.

Further, in the shown embodiments, each one of the plurality of circumferentially distributed second bar elements 43 are provided radially inside the pitch circle of the retained roller set 1 and of the roller bearing 10, as seen in a sectional plane being perpendicular to the rotational axis A.

By the above configuration, more roller elements can be provided in the circumferentially extending intermediate space 5. For example, and as shown in FIG. 4, the plurality of roller elements 2 may be provided so that they contact, or almost contact, each other.

The roller elements 2 are in the shown embodiments barrel-shaped roller elements, i.e. the roller elements 2 has an outer curved-shaped profile, as seen in a sectional plane defined by the rotational axis A.

Further, the first and second individual tube-shaped members, 3 and 4, are adapted so that an open axial side face X1 is formed in-between the first and second individual tube-shaped members on at least one outer axial side of the retained roller set 1. In the shown embodiments, both axial sides are open, allowing lubricant to more easily flow through the bearing.

The roller bearing 10 as shown in FIGS. 1 and 4 comprises an outer bearing ring 6, an inner bearing ring 7 and the retained roller set 1, wherein the retained roller set 1 is interposed in between the outer and inner bearing rings, 6 and 7.

The roller bearing 10 is configured such that the inner and outer bearing rings, 6 and 7, can be relatively misaligned with respect to the rotational axis A and/or axially displaced with respect to each other. Further, the inner bearing ring 7 comprises a cylindrically shaped bearing raceway 71 and the outer bearing ring 6 comprises a curve-shaped bearing raceway 61, as seen in a sectional plane defined by the rotational axis A. The curve-shaped bearing raceway 61 is in the shown embodiment a toroidal-shaped bearing raceway. This means that the transverse radius re of the bearing raceway 61 is larger than the circumferential radius r, i.e. the distance from the rotational axis A to the bearing raceway 61. The transverse radius re may be at least 2, 5 or 10 times larger than the circumferential radius r. The transverse radius of the roller elements 2 is preferably substantially equal to or slightly smaller than the transverse radius of the bearing raceway 61.

Figure 5:
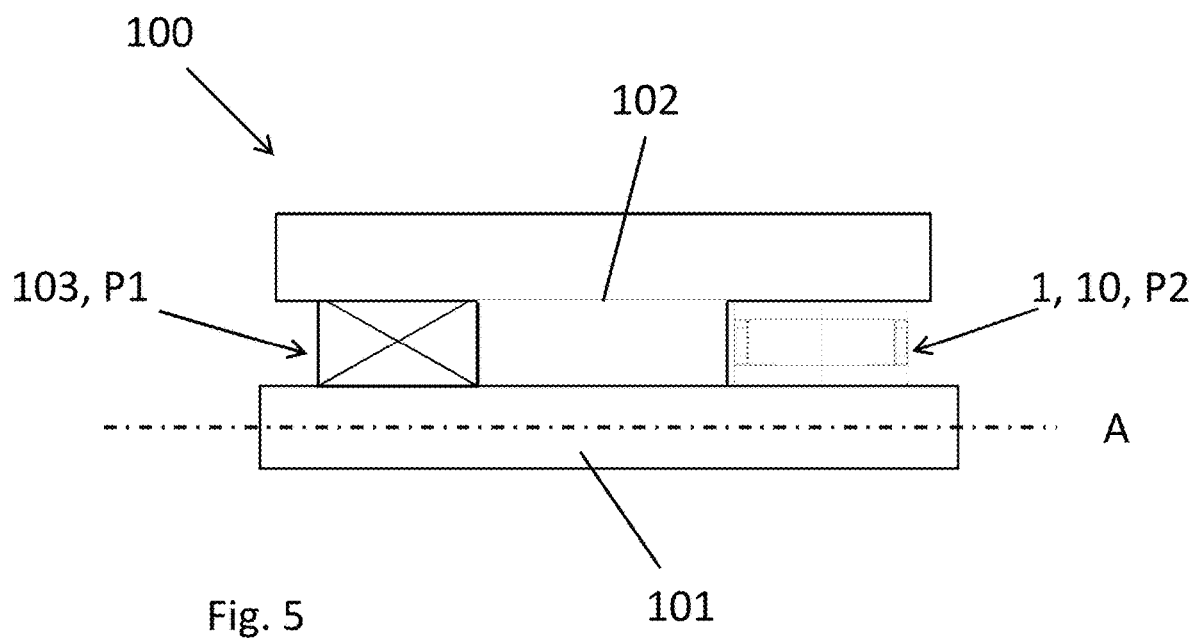
FIG. 5 schematically illustrates a portion of a rotatable load bearing application including the retained roller set of FIG. 1.

FIG. 5 shows a cross sectional view of a rotatable load bearing application 100 comprising the roller bearing 10 according to any one of the embodiments as set forth herein, the cross section being a sectional plane which includes the rotational axis A. The rotatable load bearing application has one locating bearing position P1 for axially locating the rotatable load bearing application and one or more non-locating bearing positions P2, wherein the roller bearing 10 is provided at the non-locating bearing position P2. The locating bearing position P1 may for example comprise a spherical double-row roller bearing, or any other suitable alternative rolling bearing. The application 100 as shown in FIG. 5 is a continuous casting application, or more particularly a segment roll shaft for a continuous caster having a non-rotatable shaft 101 and one or more roll mantles 102 which are adapted to support a steel slab (not shown). The rotatable load bearing application 100 may of course be configured differently, such as with a rotating shaft, and may also be configured to be used in other areas where it is beneficial to disassemble the application to e.g. perform maintenance, such as in a pulp and paper plant.

Figure 2:
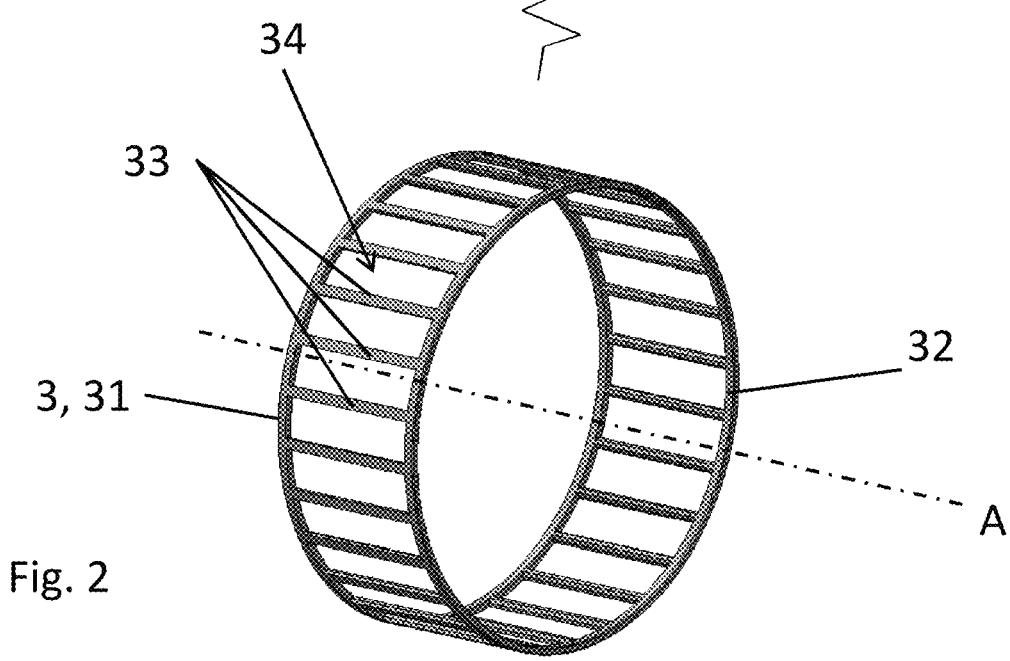
FIG. 2 is a perspective view of one of the individual tube-shaped members of FIG. 1.

FIG. 2 shows one of the individual tube-shaped members of the retained roller set 1; more particularly it shows a perspective view of the first individual tube-shaped member 3. It comprises a first annular ring 31 and a second annular ring 32 having a respective radial center which coincides with the rotational axis A, wherein the first annular ring 31 and the second annular ring 32 are arranged axially offset with respect to each other. The first individual tube-shaped member 3 further comprises a plurality of circumferentially distributed first bar elements 33 which extend axially between and join the first and second annular rings, defining a plurality of roller element pockets 34 therebetween. The configuration of the first individual tube-shaped member 3 may provide a rail-formed circular member, and this shape may be beneficial for manufacturing. For example, the first individual tube-shaped member 3 may be manufactured by first providing an elongated element, such as sheet metal, which has been subjected to an operation in which the roller element pockets 34 have been provided, by e.g. a cutting operation. The elongated element may then be cut into an appropriate length and thereafter it may be bent into a tube shape, whereby the outer ends of the elongated elements are joined. Alternatively, the first individual tube-shaped member may be segmented, i.e. it may be made of two or more segments which together, when connected, provide the tube shape. It shall be noted that also the second individual tube-shaped member may be produced in a similar manner as mentioned in the above. Further, the individual tube-shaped members may be made of any kind of suitable material, such as steel, e.g. in the form of sheet metal, polymer, brass etc.

It is to be understood that the present invention is not limited to the embodiments described above and illustrated in the drawings; rather, the skilled person will recognize that many changes and modifications may be made within the scope of the appended claims.

What is claimed is:

1. A retained roller set comprising:
a first individual tube-shaped member having a longitudinally extending rotational axis and a radial extension perpendicular to the rotational axis, the first individual tube-shaped member comprising a first annular ring and a second annular ring axially spaced from the first annular ring, the first and second annular rings each having a radial center at the rotational axis, the first individual tube-shaped member further comprising a plurality of circumferentially distributed first bar elements extending axially from the first annular ring to the second annular ring, adjacent pairs of the first bar elements defining a plurality of roller element first pockets therebetween;
a second individual tube-shaped member having a longitudinally extending rotational axis and a radial extension perpendicular to the rotational axis of the second individual tube-shaped member, the second individual tube-shaped member comprising a third annular ring and a fourth annular ring axially spaced from the third annular ring, the third and fourth annular rings each having a radial center at the rotational axis of the second individual tube-shaped member, the second individual tube-shaped member further comprising a plurality of circumferentially distributed second bar elements extending axially from the third annular ring to the fourth annular ring, adjacent pairs of the second bar elements defining a plurality of roller element second pockets therebetween;
the second individual tube-shaped member having an outer radius which is smaller than an inner radius of the first individual tube-shaped member,
the second individual tube-shaped member being located radially inside the first individual tube-shaped member with the first rotational axis aligned with the second rotational axis and radially spaced from the first individual tube-shaped member such that a circumferentially extending intermediate space is formed between the first individual tube-shaped member and the second individual tube-shaped member, and
a plurality of roller elements in the circumferentially extending intermediate space with a first portion of each of the plurality of roller elements extending into a roller element first pocket and a second portion of each of the plurality of roller elements extending into a roller element second pocket.

2. The retained roller set according to claim 1, wherein each one of the first bar elements is located radially outside a pitch circle of the roller elements and each one of the second bar elements is provided radially inside the pitch circle.

3. The retained roller set according to claim 1, wherein the roller elements of the plurality of roller elements are barrel-shaped.

4. The retained roller set according to claim 1, wherein the first and second individual tube-shaped members are configured such that an open axial side face is formed between the first and second individual tube-shaped members on at least one outer axial side of the roller retainer set.

5. The retained roller set according to claim 1, wherein an axial length of each of the first pockets is equal to an axial length of each of the second pockets.

6. The retained roller set according to claim 5, wherein a circumferential width of each of the first pockets is equal to a circumferential width of each of the second pockets.

7. The retained roller set according to claim 6, wherein an axial length of the first individual tube-shaped member is equal to an axial length of the second individual tube-shaped member.

8. The retained roller set according to claim 7, wherein each one of the first bar elements is located radially outside a pitch circle of the roller elements and each one of the second bar elements is provided radially inside the pitch circle, and
wherein the roller elements of the plurality of roller elements are barrel-shaped.

9. A roller bearing, comprising:
an outer bearing ring;
an inner bearing ring; and
the retained roller set according to claim 1 mounted between the outer bearing ring and the inner bearing ring.

10. The roller bearing according to claim 9, configured as a toroidal roller bearing.

11. The roller bearing according to claim 9, wherein a first one of the outer bearing ring or the inner bearing ring comprises a cylindrically shaped bearing raceway, as seen in a sectional plane defined by the rotational axis of the first individual tube-shaped member.

12. The roller bearing according to claim 11, wherein a second one of the outer bearing ring and the inner bearing ring comprises a toroidal bearing raceway.

13. The roller bearing according to claim 9, wherein the roller bearing is configured as a separable roller bearing in which the outer bearing ring is removable from a mounting position independently of the inner bearing ring or in which the inner bearing ring is removable from the mounting position independently of the outer bearing ring.

14. A rotatable load bearing system comprising:
a locating bearing position; and
at least one non-locating bearing position, and
the roller bearing according to claim 9 at the non-locating position.

* * * * *